United States Patent
DeBerry et al.

(10) Patent No.: US 10,077,613 B2
(45) Date of Patent: Sep. 18, 2018

(54) ANTI-ROTATION KEY FOR CONNECTOR ASSEMBLY

(71) Applicant: Dril-Quip, Inc., Houston, TX (US)

(72) Inventors: Blake T. DeBerry, Houston, TX (US); Morris B. Wade, Houston, TX (US)

(73) Assignee: Dril-Quip, Inc., Houston, TX (US)

( * ) Notice: Subject to any disclaimer, the term of this patent is extended or adjusted under 35 U.S.C. 154(b) by 241 days.

(21) Appl. No.: 15/169,092

(22) Filed: May 31, 2016

(65) Prior Publication Data

US 2016/0356096 A1  Dec. 8, 2016

Related U.S. Application Data

(60) Provisional application No. 62/169,934, filed on Jun. 2, 2015.

(51) Int. Cl.
*E21B 17/043* (2006.01)
*F16L 15/08* (2006.01)

(52) U.S. Cl.
CPC .......... *E21B 17/043* (2013.01); *F16L 15/08* (2013.01); *Y10T 29/49881* (2015.01); *Y10T 403/589* (2015.01)

(58) Field of Classification Search
CPC .... E21B 17/042; E21B 17/043; E21B 17/046; F16L 15/08; Y10T 29/49881; Y10T 403/589
USPC ...................................... 285/90, 91, 92, 330
See application file for complete search history.

(56) References Cited

U.S. PATENT DOCUMENTS

| 3,086,796 A | 4/1963 | Yancey |
| 8,690,200 B1* | 4/2014 | Patterson, Jr. ........ E21B 17/043 |
| | | 285/92 X |
| 9,890,598 B2* | 2/2018 | Steen |
| 2014/0103640 A1* | 4/2014 | O'Dell .................. E21B 17/046 |
| | | 285/91 |
| 2014/0103645 A1* | 4/2014 | Steen ..................... F16L 15/08 |
| | | 285/330 |
| 2014/0125053 A1* | 5/2014 | Raynal .................. E21B 17/043 |

FOREIGN PATENT DOCUMENTS

WO   2014/058967 A2   4/2014

OTHER PUBLICATIONS

Search Report issued in related United Kingdom Application No. 1609587.9, dated Oct. 27, 2016 (3 pages).

* cited by examiner

*Primary Examiner* — Greg Binda
*Assistant Examiner* — Zachary T Dragicevich
(74) *Attorney, Agent, or Firm* — Baker Botts L.L.P.

(57) ABSTRACT

An improved anti-rotation key designed to prevent rotation of a first threaded portion of a connector assembly with respect to a second threaded portion of the connector assembly is provided. The disclosed key includes several features that facilitate easier, faster, and more accurate securing of the key within the connector. For example, the key may include features that guide, pre-load, and smooth the transition of the key from an initial position to a fully engaged and energized position. Specifically, the key may include a tapered first surface for engaging with a tapered surface of the first threaded portion, and a set of short teeth and a set of long teeth on a second surface opposite the tapered first surface for engaging with an engagement surface on the second threaded portion

16 Claims, 4 Drawing Sheets

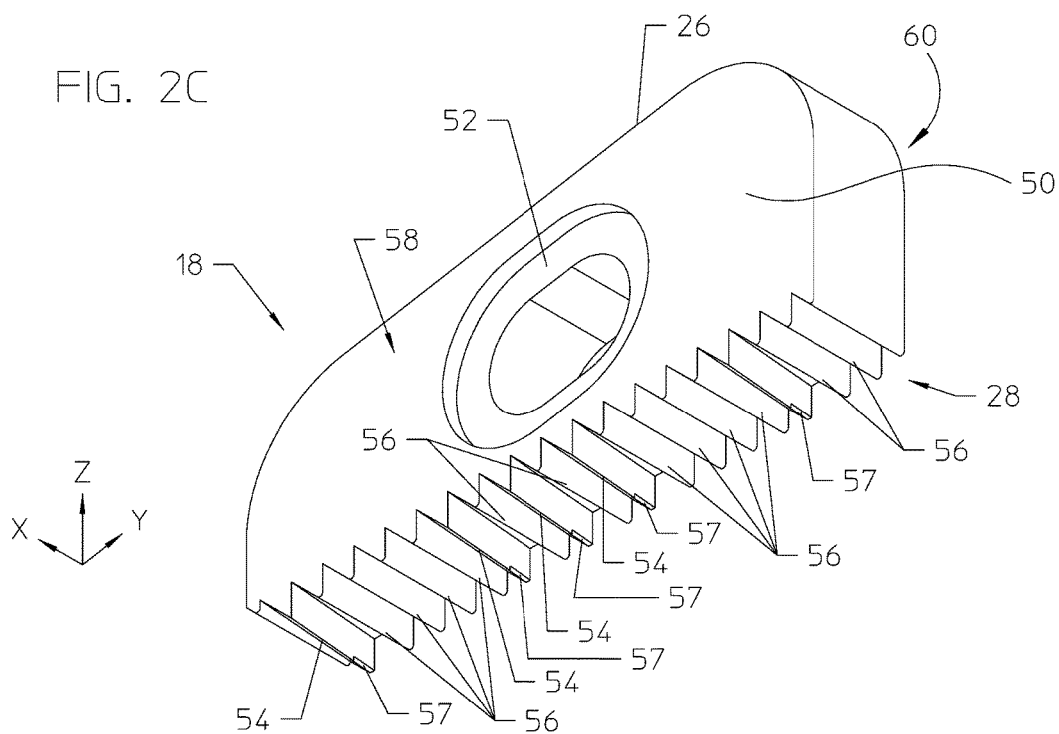
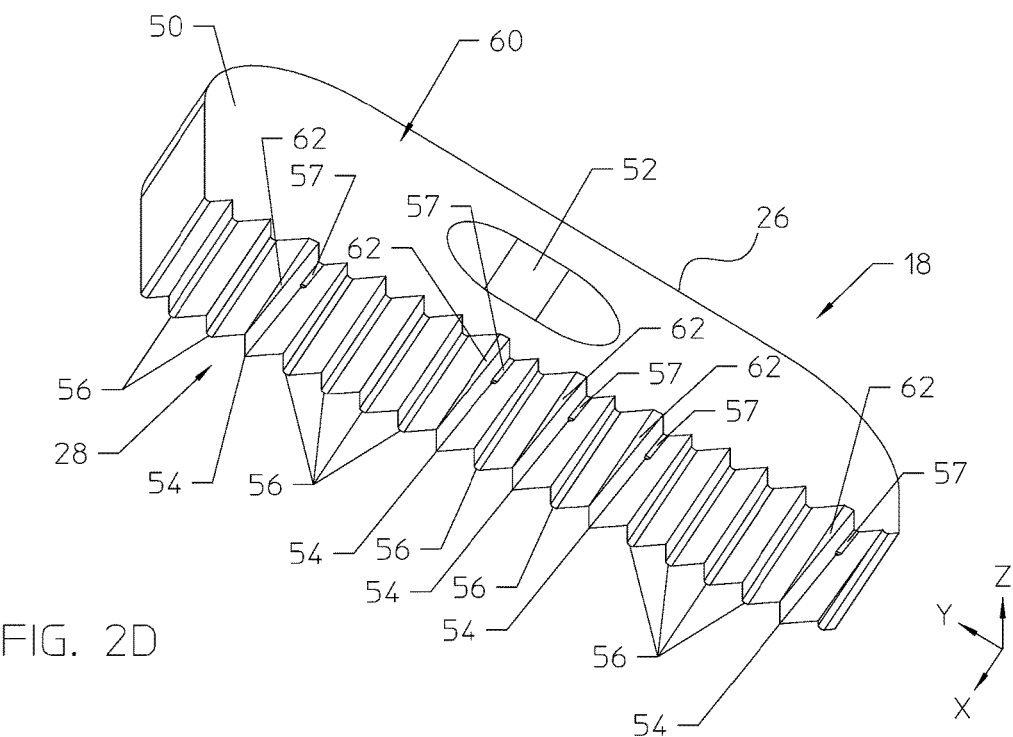

ANTI-ROTATION KEY FOR CONNECTOR ASSEMBLY

CROSS REFERENCE TO RELATED APPLICATIONS

The present application claims priority to U.S. provisional application Ser. No. 62/169,934, entitled "Anti-Rotation Key for Connector Assembly", filed on Jun. 2, 2015.

TECHNICAL FIELD

The present disclosure relates generally to connector assemblies for coupling strings of tubular and other components, and more particularly, to anti-rotation devices used to prevent rotation of threaded connector assemblies.

BACKGROUND

Offshore oil and gas drilling operations typically include the make-up of strings of pipe or casing members, frequently of relatively large diameter. The tubular strings may be driven into the ground underwater to be used for anchoring the drilling platform. Such strings are also used as conduits in the water through which a well may be initiated. The joint between members of such tubular strings must provide both structural strength and fluid pressure integrity. Such features of a joint might be provided, for example, by welding. However, because welding is a time-consuming operation, and drilling rig rates are high, particularly offshore, mechanical connectors are generally preferred. Typical mechanical connectors available include threaded type connectors in which tubular members are mutually rotated to thread a pin and box connector assembly, breach block connectors, and snap lock connectors.

In threaded mechanical connector assemblies an externally threaded end, known as the pin, mates with an internally threaded section, known as the box. The pin and the box on a threaded connector assembly are designed to be engaged with each other and rotated to a specific torque value for connecting the ends. After the connection is made, anti-rotation devices can be installed to secure the pin and the box together at the desired make-up torque. The anti-rotation devices are designed to ensure that the threaded portions of the connector assembly do not become tightened over the desired make-up torque or loosened from each other in response to forces applied to the pipe or casing members in the string.

Existing anti-rotation devices often feature a mechanical key that can be selectively positioned in a recess between the pin and the box of the connector assembly to prevent rotation of the pin and the box relative to each other once the make-up torque is reached. Unfortunately, these keys typically do not go into action to engage with the connector assembly until after the connection is loosened slightly. That is, the keys are generally first positioned in the recesses of the connector assembly, and then the pin and box are rotated slightly relative to each other to energize the key. As a result, the connection may be secured at a different torque than the initial desired make-up torque.

In addition, some existing anti-rotation keys are designed to interface very closely with the connector assembly to fill a recess therein. As such, these keys can be difficult to position in the corresponding recess and often must be hammered into engagement with the connector assembly using a large amount of force. This hammering process takes an undesirable amount of time and energy to ensure that the keys are lodged into their respective recesses in the connector assembly.

BRIEF DESCRIPTION OF THE DRAWINGS

For a more complete understanding of the present disclosure and its features and advantages, reference is now made to the following description, taken in conjunction with the accompanying drawings, in which:

FIGS. 2A-2D are front, bottom, and perspective views illustrating the anti-rotation key of FIGS. 1A and 1B, in accordance with an embodiment of the present disclosure.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to an improved anti-rotation key designed to prevent rotation of a first threaded portion of a connector assembly with respect to a second threaded portion of the connector assembly. The disclosed anti-rotation key includes several features that facilitate easier, faster, and more accurate securing of the key within the connector to prevent rotation of the threaded portions of the connector. For example, the anti-rotation key may include features that guide, pre-load, and smooth the transition of the key from an initial position to a fully engaged and energized position.

The presently disclosed anti-rotation key may include a tapered surface on one side and a surface having a plurality of teeth on an opposite side. The tapered surface is used to engage a tapered surface of the first threaded portion of the connector assembly, while the plurality of teeth are used to engage an engagement surface of the second threaded portion. The plurality of teeth may include two types of teeth arranged in a single row along the surface of the key. The two types of teeth include a set of long teeth and a set of short teeth. These two sets may be interspersed along the surface of the key. The long teeth are generally slanted with respect to a thickness of the key, in order to guide the key into an energized position between the threaded portions as the key is pushed into the connector assembly. In some embodiments, the long teeth may include shoulders or cutouts formed along the ends of the teeth to facilitate an easy insertion of the key into the recess between the threaded portions. Once the key is pushed into the recess, the shorter teeth may engage the engagement surface of the second threaded portion as well to prevent rotation of the threaded portions relative to each other.

Figure 1A:
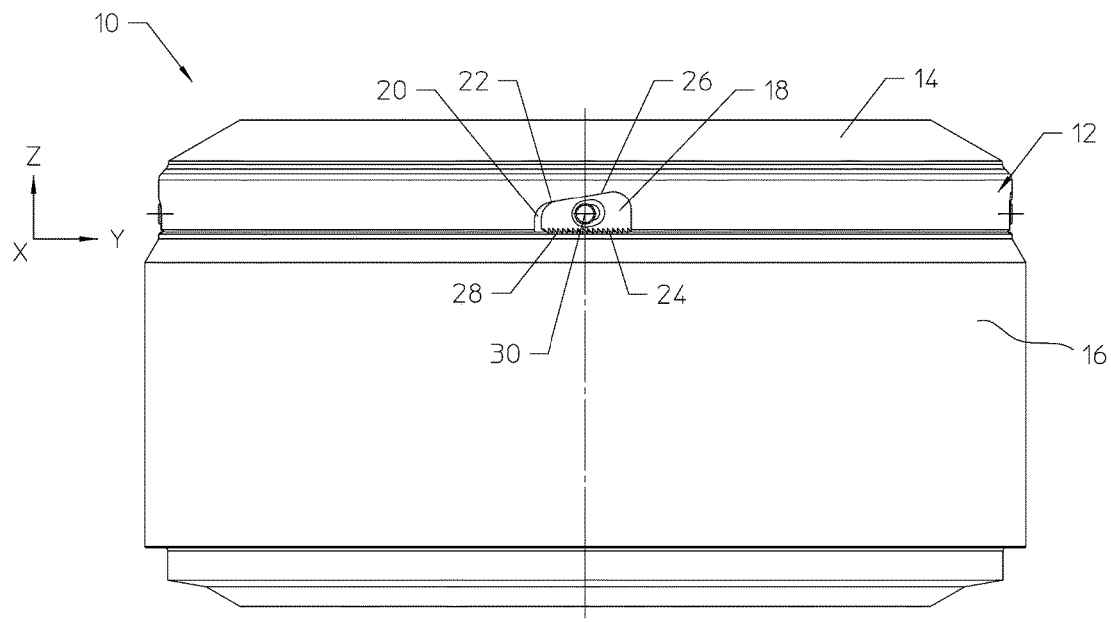
FIGS. 1A and 1B are front views of a connector assembly with an improved anti-rotation key going from an initial placement to an energized placement within the connector assembly, in accordance with an embodiment of the present disclosure.
Figure 1B:
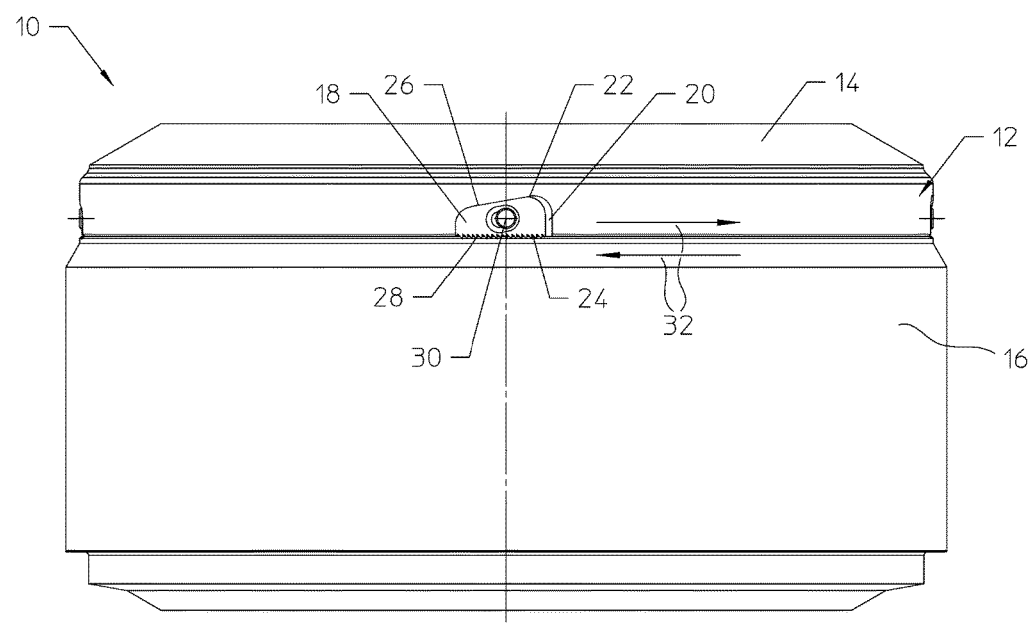

Turning now to the drawings, FIGS. 1A and 1B illustrate a system 10 that includes a connector assembly 12 with a first threaded portion 14 and a second threaded portion 16 that may be secured in a desired rotational position relative to each other by an improved anti-rotation key 18. The first threaded portion 14 of the connector assembly 12 may be an externally threaded end, known as the "pin" while the second threaded portion 16 is an internally threaded section, known as the "box".

The pin and box are designed to be threaded together to connect a first tubular component (not shown) to a second tubular component (not shown). In some embodiments, the pin is formed into the first tubular component and the box is formed into the second tubular component, such that the connector assembly 12 is integral to the tubular components being connected. In other embodiments, the pin and the box may be separate components that are attached to their respective tubular components as desired to facilitate the connection. However, the present disclosure is not limited to any specific configuration of the pin and box relative to the tubular components being connected.

When forming these tubular connections using the connector assemblies 12, it is desirable to rotate the first and second threaded portions 14 and 16 relative to each other until the connector assembly 12 reaches a desired make-up torque. Upon reaching this make-up torque, the connection may be secured using one or more anti-rotation keys 18 to prevent the threaded portions 14 and 16 from being rotated away from their designated make-up torque. In FIGS. 1A and 1B, only one such anti-rotation key 18 is illustrated, but it should be noted that in some embodiments any desirable number of keys 18 may be positioned within the connector assembly 12 to prevent further rotation of the threaded portions 14 and 16.

As illustrated, the anti-rotation key 18 may be selectively positioned within a recess 20 formed in the connector assembly 12 to lock the threaded portions 14 and 16 in a rotational position relative to each other. The recess 20 is defined by a tapered surface 22 formed into the first threaded portion 14 and an engagement surface 24 located on the second threaded portion 16. The illustrated recess 20 is designed to be generally longer than the key 18 in a longitudinal direction of the key 18 (parallel to the Y-axis), in order to facilitate self-guiding of the key from an initial position (FIG. 1A) to an energized position (FIG. 1B).

The anti-rotation key 18 generally includes a tapered surface 26 on one side. This tapered surface 26 is designed to engage with the tapered surface 22 of the first threaded portion 14. The anti-rotation key 18 may also include a row of several teeth 28 disposed on an opposite side of the key 18 from the tapered surface 26. The plurality of teeth 28 are designed to engage with the engagement surface 24 of the second threaded portion 16. As described in detail below, the plurality of teeth 28 on the key 18 may include two different types or sets of teeth that are used to guide the key 18 from the initial position of FIG. 1A to the energized position of FIG. 1B. In some embodiments, the plurality of teeth 28 may all include "angled" teeth, as described below.

FIG. 1A shows the anti-rotation key 18 disposed in an initial loading position within the recess 20. This is the position where the key 18 is first seated within the recess 20 during installation of the key 18. At this point, the key 18 is not fully engaged with the connector assembly 12. A bolt 30 may be positioned through an aperture in the key 18 to couple the key 18 with the connector assembly 12. From this position, the key 18 may be pressed further inward into the recess 20 (e.g., via the bolt 30 or some other tool) in a direction parallel to the illustrated X-axis. As the key 18 is pressed further inward into the recess 20, the teeth 28 may interface with the second threaded portion 16 in a way that guides the key 18 in a lateral direction (approximately parallel to the Y-axis) from the initial loading position to the energized position of FIG. 1B.

The term "energize" refers to the key 18 being brought into full engagement with the connector assembly 12. As the key 18 moves laterally relative to the connector assembly 12 into the smaller side of the recess 20, the tapered surface 26 of the key 18 may load against the tapered surface 22 of the first threaded portion 14 while the teeth 28 dig further into the engagement surface 24 of the second threaded portion 16. Upon reaching the energized position shown in FIG. 1B, the anti-rotation key 18 is fully engaged with the tapered surface 22 of the first threaded portion 14 and with the engagement surface 24 of the second threaded portion 16.

Thus, the disclosed anti-rotation key 18 is self-energizing as it is pushed further into the recess 20. Instead of requiring rotation of one or both of the threaded portions to energize the key 18, the disclosed key 18 is configured to pre-load itself into the energized position in response to being pushed further into the recess 20. Thus, the disclosed key 18 may enable the system 10 to be connected at a more accurate make-up torque than is possible with existing systems that require rotation of the connector to energize the key. As described below, the disclosed key 18 may also include features that allow the key 18 to be easily pushed into the energized position without taking an undesirable amount of time or energy.

It should be noted that the illustrated anti-rotation key 18 is a right-handed key designed to prevent right-handed turns of the first threaded portion 14 of the connector assembly relative to the second portion 16. A right-handed turn is illustrated by arrows 32 in FIG. 1B. If the first threaded portion 14 moves relative to the second threaded portion 16 in this right-handed direction, the key 18 will apply a stopping force to the first threaded portion 14 via the pre-loaded tapered surface 26 and the teeth 28 digging into the second threaded portion 16. In some embodiments, it may be desirable for the connector assembly 12 to have at least one right-handed key 18 positioned therein and at least one left-handed key 18 positioned therein. This may prevent rotation of the threaded portions 14 and 16 relative to each other in either direction. These right- and left-handed anti-rotation keys 18 may be positioned at 180 degrees from each other around the circumference of the connector assembly 12. In other embodiments, a greater number of right- and left-handed keys 18 may be positioned and energized around the circumference of the connector assembly 12.

It should be noted that variations on the illustrated system 10 may be used in other embodiments. For example, in other embodiments the pin and the box sections of the connector assembly 12 may be reversed, such that the box acts as the first threaded portion 14 having the tapered surface 22 and the pin acts as the second threaded connection 16 having the engagement surface 24.

Figure 2A:
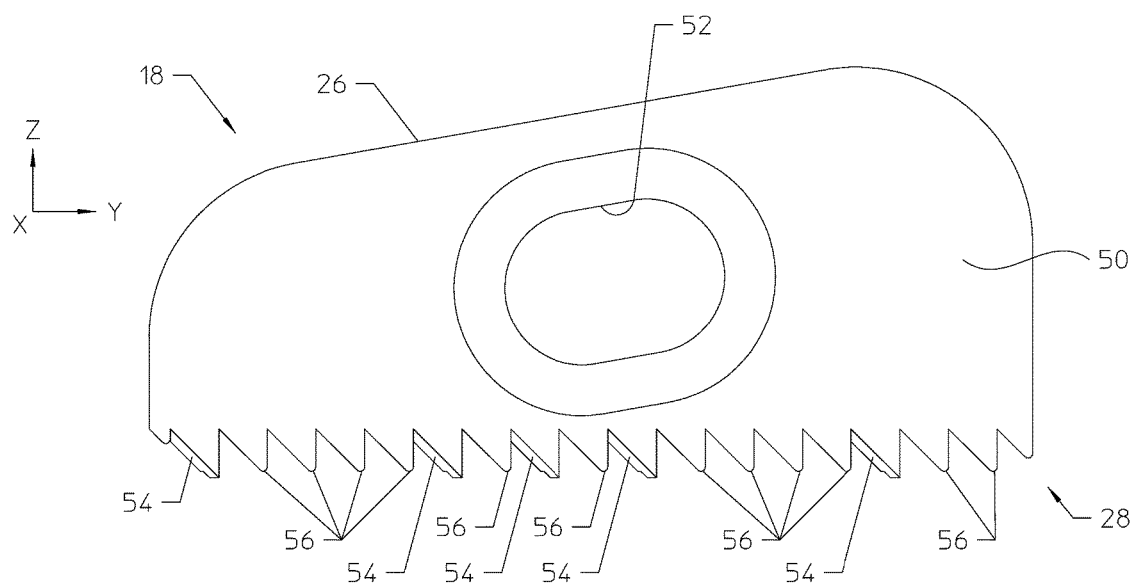
Figure 2B:
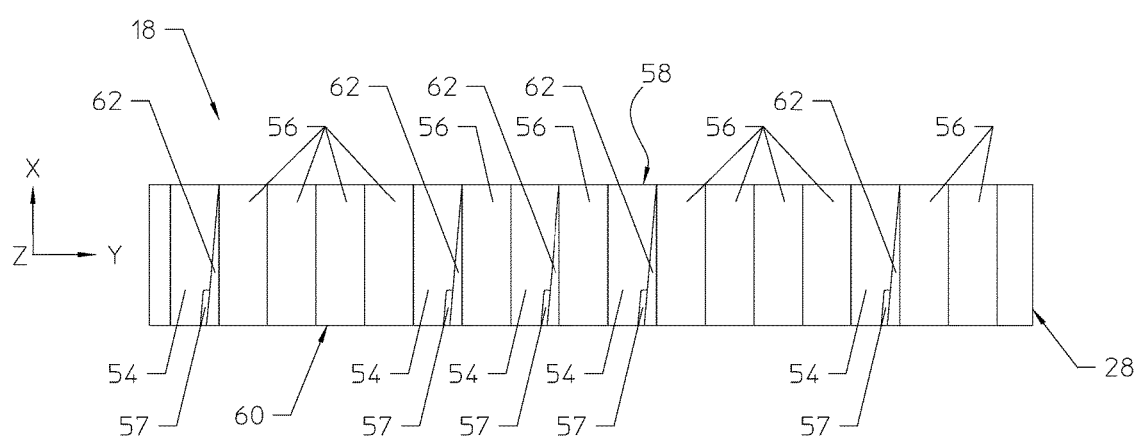

A detailed embodiment of the anti-rotation key 18 is illustrated in FIGS. 2A-2D. FIG. 2A provides a front view of the right-handed version of the key 18, and FIG. 2B shows the bottom view of this key 18. FIGS. 2C and 2D are perspective views of the key 18 that highlight the modifications to the teeth 28 that enable relatively easy installation. As illustrated, the anti-rotation key 18 may generally include a body 50 with the tapered surface 26 at one end and the plurality of teeth 28 at the other end. There may be an aperture 52 formed through the body 50 to enable connection of the key 18 to the connector assembly using a bolt, as shown above in FIGS. 1A and 1B. The aperture 52 may be an elongated shape, as shown, to enable the key 18 to move laterally (along the Y-axis) with respect to the bolt as the bolt is being coupled to the connector assembly during installation of the key 18.

The plurality of teeth 28 may include at least two different types of teeth all arranged in a single row along the bottom of the key 18. These two types may include, for example, a set of long teeth 54 and a set of short teeth 56. The long teeth 54 may be longer than the short teeth 56, such that they extend further from the body 50 of the key 18 in a direction parallel to the illustrated Z-axis. As illustrated, the long teeth 54 may be interspersed among the short teeth 56. In the illustrated embodiment, more of the long teeth 54 are concentrated toward the middle of the row of teeth 28. However, in other embodiments, the long teeth 54 may be more evenly distributed along the bottom surface (e.g., every other tooth). It may be desirable in some embodiments to include at least one short tooth 56 between any two adjacent long teeth 54, to facilitate easy installation of the key 18 into the connector assembly as the long teeth 54 grip the mating surface of the connector.

Having these two sets of teeth 54 and 56 may enable relatively easy installation of the key 18 into the recess of the connector assembly. This is because when the key 18 is first installed, only the long teeth 54 may actually be in contact with the engagement feature of the second threaded portion of the connector assembly. Existing anti-rotation keys typically feature a single set of teeth of equal length and, thus, all of these teeth must be pressed into engagement with the engagement surface from the beginning. In the disclosed embodiment, however, the key 18 is designed to initially engage the engagement surface with only the long set of teeth 54 before the key 18 is energized. Once the key 18 transitions to the energized position, all the teeth 28, including the long teeth 54 and the short teeth 56, will engage the engagement surface of the second threaded portion.

In some embodiments, the long teeth 54 may feature cutouts 57 or shoulders formed therein to aid in the installation of the key 18. These cutouts 57 may generally be formed at a distal end of the long teeth 54 away from the body 50 of the key 18. The cutouts 57 may be generally disposed on one side of the long teeth 54, specifically the side of the teeth 54 that will first be disposed within the recess (i.e., along a back face 60 of the key 18). The cutouts 57 may leave this edge of the long teeth 54 extending the same distance as the short teeth 56 from the body 50 of the key 18. The cutout portions 57 of the long teeth 54 may facilitate relatively easy initial engagement of the long teeth 54 with the engagement surface of the second threaded portion of the connector assembly. Once the key 18 is initially positioned in the recess (as shown in FIG. 1A) using the cutout portions 57 of the long teeth 54, a force may be applied in a direction of the X-axis to push the full-length portions of the long teeth 54 into engagement with the surface as well.

In the disclosed embodiments, the long teeth 54 may be angled relative to a thickness dimension of the key 18. The term "thickness dimension" refers to a direction parallel to the illustrated X-axis. This thickness dimension may represent a perpendicular line cutting directly from a front face 58 of the key 18 to the back face 60 of the key 18. In the illustrated embodiment, the short teeth 56 are generally aligned with the thickness dimension, but the long teeth 54 all feature an angled face 62 that is angled with respect to the thickness dimension. In other embodiments, both the long teeth 54 and the short teeth 56 may have angled faces 62.

The angled faces 62 of the long teeth 54 may help to guide the key 18 into the recess from the initial position of FIG. 1A to the final energized position of FIG. 1B. Once the key 18 is initially seated in the recess (with the cutout sections 57 of the long teeth 54 in engagement with the surface of the second threaded portion), additional force may be applied to the front face 58 of the key 18 to push the full-length portion of the long teeth 54 into engagement with the surface. As the key 18 is pushed further into the recess, the angled long teeth 54 may direct the key 18 to move laterally within the recess, thereby shifting the key 18 into increased contact with the tapered surface and the engagement surface of the connector assembly.

As the key 18 moves further laterally, the short teeth 56 may be brought into engagement with the mating surface of the connector assembly. The tapered surface 26 may push against the mating tapered surface of the connector while the long and short teeth 54 and 56 are both driven into further contact with the engagement surface. Once the teeth 28 are engaged in this manner, the threaded portions of the connector assembly will not be able to rotate to unlock the key 18. If the threaded portions start to rotate, the tapered surface 26 and the teeth 28 may continue to engage with the connector to prevent the connector from unlocking.

Figure 3:
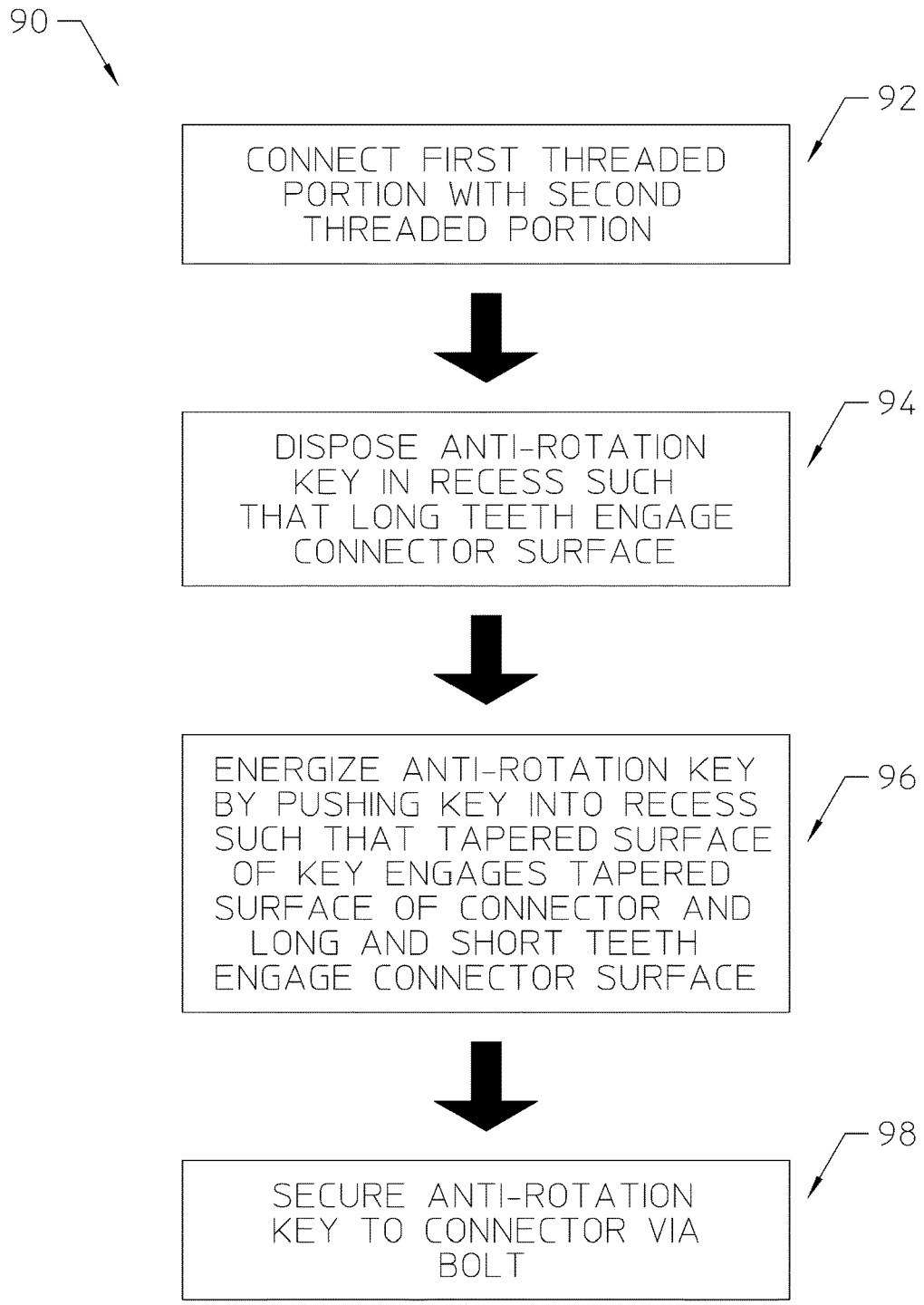
FIG. 3 is a process flow diagram of a method for securely coupling tubular members using a connector assembly with an improved anti-rotation key, in accordance with an embodiment of the present disclosure.

FIG. 3 illustrates a method 90 for securely coupling two tubular components using the presently disclosed anti-rotation key 18 and connector assembly 12. The method 90 may include connecting (block 92) the first threaded portion 14 of the connector assembly 12 with the second threaded portion 16 of the connector assembly 12 to connect two tubular components. The method 90 may then include disposing (block 94) the anti-rotation key 18 in the recess 20 of the connector assembly 12 such that the set of long teeth 54 engage with the engagement surface 24 of the second threaded portion 16. In some embodiments, this may involve seating the long teeth 54 in a position against the engagement surface 24 via the cutouts 57 or shoulders formed in one side of the long teeth 54. At this point in the process, the key 18 may be disposed in the initial loading position shown in FIG. 1A.

The method 90 further includes energizing (block 96) the anti-rotation key 18 within the connector assembly 12 by pushing the key 18 into the recess 20 such that the tapered surface 26 engages the tapered surface 22 of the first threaded portion 14 and the short teeth 56 and the long teeth 54 engage with the engagement surface 24 of the second threaded portion 16. This may bring the key 18 into the energized position shown in FIG. 1B. As mentioned above, this may be accomplished via the angled long teeth guiding the key 18 in a lateral direction within the recess 20 as the key 18 is being pushed further into the recess 20. In some embodiments, pushing the key 18 into the recess after it is initially seated may be accomplished through the use of a hammer or a pneumatic tool to energize the anti-rotation key 18. Since only the long teeth 54 are engaged with the surface 24 of the connector assembly 12 initially, less force is needed to push the key 18 further into the recess 20. This also makes the transition smoother from the initial loading position of FIG. 1A to the energized position of FIG. 1B, as compared to existing systems.

In some embodiments, the method 90 may also include securing (block 98) the anti-rotation key 18 to the connector assembly 12 via a bolt 30 or other coupling mechanism. This may be accomplished at the same time and in the same step as energizing (block 96) the key 18 within the connector assembly 12. That is, the bolt 30 may be placed through the aperture 52 of the key 18 and then bolted or screwed into the connector assembly 12 in a manner that applies a pushing force to the key 18 to bring the key 18 further into the recess 20. At this point, as the bolt 30 brings the key 18 closer to the connector assembly 12, the teeth 54 of the key 18 may perform the self-energizing step described above. Using the bolt action to initiate the self-energizing of the key 18 within the connector assembly 12 may save time and energy during assembly of the connection. If it is desirable to remove the key 18 from the connector assembly 12, the bolt 30 may be removed from the connector 12 (and the key 18), and the key 18 may simply be slid out of the recess by moving the key 18 relative to the connector 12 in its non-locking direction.

Although the present disclosure and its advantages have been described in detail, it should be understood that various changes, substitutions and alterations can be made herein without departing from the spirit and scope of the disclosure as defined by the following claims.

What is claimed is:

1. An anti-rotation key for preventing rotation of a first threaded portion of a connector assembly relative to a second threaded portion of the connector assembly, wherein the anti-rotation key comprises:
   a tapered first surface for engaging with a tapered surface of the first threaded portion; and
   a plurality of teeth disposed on a second surface opposite the tapered first surface for engaging with an engagement surface on the second threaded portion, wherein the plurality of teeth comprise a set of long teeth and a set of short teeth;
   wherein the long teeth extend further from a body of the anti-rotation key than the short teeth, and wherein the long teeth are angled with respect to a thickness dimension of the anti-rotation key to guide the anti-rotation key into an energized position against the tapered surface of the first threaded portion as the anti-rotation key is pushed into the connector assembly, wherein the plurality of teeth are disposed in a single row along the second surface of the anti-rotation key, and wherein the long teeth are interspersed with the short teeth along the second surface of the anti-rotation key.

2. The anti-rotation key of claim 1, wherein the set of long teeth and the set of short teeth are all configured to engage with the engagement surface on the second threaded portion when the anti-rotation key is in the energized position.

3. The anti-rotation key of claim 1, wherein the long teeth each comprise a cutout or shoulder along a distal portion of the long teeth extending from the body.

4. The anti-rotation key of claim 3, wherein the cutout or shoulder is disposed on a side of the second surface designed to initially interface with the engagement surface of the second threaded portion during placement of the anti-rotation key.

5. The anti-rotation key of claim 1, further comprising an aperture formed through the body of the anti-rotation key for receiving a coupling mechanism therethrough.

6. A system, comprising:
   a connector assembly for connecting two tubular components, wherein the connector assembly comprises a first threaded portion with a tapered surface formed therein and a second threaded portion with an engagement surface formed therein, wherein the tapered surface and the engagement surface define a recess within the connector assembly; and
   an anti-rotation key disposed in the recess, wherein the anti-rotation key comprises:
   a tapered first surface engaged with the tapered surface in the first threaded portion; and
   a plurality of teeth disposed on a second surface opposite the tapered first surface and engaged with the engagement surface on the second threaded portion, wherein the plurality of teeth comprise a set of long teeth and a set of short teeth;
   wherein the long teeth extend further from a body of the anti-rotation key than the short teeth, and wherein the long teeth are angled with respect to a thickness dimension of the anti-rotation key to guide the anti-rotation key into an energized position against the tapered surface of the first threaded portion as the anti-rotation key is pushed into the recess, wherein the plurality of teeth are disposed in a single row along the second surface of the anti-rotation key, and wherein the long teeth are interspersed with the short teeth.

7. The system of claim 6, wherein the set of long teeth and the set of short teeth are all engaged with the engagement surface on the second threaded portion when the anti-rotation key is in the energized position.

8. The system of claim 6, wherein the long teeth each comprise a cutout or shoulder along a distal portion of the long teeth extending from the body of the anti-rotation key.

9. The system of claim 6, further comprising a second anti-rotation key, wherein the anti-rotation key prevents rotation of the first threaded portion relative to the second threaded portion in a first direction, and wherein the second anti-rotation key prevents rotation of the first threaded portion relative to the second threaded portion in a second direction opposite the first direction.

10. The system of claim 6, further comprising a coupling mechanism disposed through an aperture in the anti-rotation key to secure the anti-rotation key to the connector assembly.

11. A method, comprising:
   connecting a first threaded portion of a connector assembly with a second threaded portion of the connector assembly, wherein the connector assembly comprises a recess defined by a tapered surface in the first threaded portion and an engagement surface in the second threaded portion;
   disposing an anti-rotation key in an initial loading position within the recess by engaging a set of long teeth on a surface of the anti-rotation key with the engagement surface of the second threaded portion, wherein the long teeth extend further from a body of the anti-rotation key than a set of short teeth on the surface, and wherein the long teeth are angled with respect to a thickness dimension of the anti-rotation key, wherein the long teeth and the short teeth are disposed in a single row along the surface of the anti-rotation key, and wherein the long teeth are interspersed with the short teeth; and
   energizing the anti-rotation key within the connector assembly by pushing the anti-rotation key into the recess and guiding the anti-rotation key from the initial loading position into an energized position via the angled long teeth, wherein in the energized position a tapered surface of the anti-rotation key engages the tapered surface of the first threaded portion and the short teeth and the long teeth engage with the engagement surface of the second threaded portion.

12. The method of claim 11, further comprising securing the anti-rotation key to the connector assembly via a coupling mechanism.

13. The method of claim 12, wherein securing the anti-rotation key to the connector assembly and energizing the anti-rotation key occur at approximately the same time.

14. The method of claim 11, wherein disposing the anti-rotation key in the recess comprises seating the long teeth against the engagement surface via cutouts or shoulders formed in the long teeth.

15. The method of claim 11, further comprising utilizing a hammer or pneumatic tool to push the anti-rotation key further into the recess.

16. The method of claim 11, further comprising:
- disposing and energizing a second anti-rotation key in a corresponding second recess within the connector assembly;
- preventing rotation of the first threaded portion relative to the second threaded portion in a first direction via the anti-rotation key; and
- preventing rotation of the first threaded portion relative to the second threaded portion in a second direction via the second anti-rotation key.

* * * * *